United States Patent
Nien

(10) Patent No.: US 6,321,803 B1
(45) Date of Patent: Nov. 27, 2001

(54) WOODEN BLIND SLATS AND METHOD FOR MAKING SAME

(75) Inventor: Ming Nien, Changhua Hsien (TW)

(73) Assignee: Nien Made Enterprises Co. Ltd., Changhua Hsien (TW)

( * ) Notice: Subject to any disclaimer, the term of this patent is extended or adjusted under 35 U.S.C. 154(b) by 0 days.

(21) Appl. No.: 09/427,663

(22) Filed: Oct. 27, 1999

(51) Int. Cl.$^7$ ............................................. B27D 1/00
(52) U.S. Cl. .................. 144/350; 144/329; 144/346; 144/380; 428/106
(58) Field of Search .................. 144/346, 329, 144/350, 352, 364, 380, 345; 428/105, 106, 54, 55; 52/745.19

(56) References Cited

U.S. PATENT DOCUMENTS

| | | | |
|---|---|---|---|
| 781,376 | * 1/1905 | Sorensen | 144/346 |
| 947,001 | * 1/1910 | Kertscher | 144/350 |
| 2,062,590 | * 12/1936 | Lundquist | 156/182 |
| 2,544,935 | * 3/1951 | Orner | 144/350 |
| 3,961,654 | * 6/1976 | Hasenwinkle | 144/348 |
| 3,969,558 | * 7/1976 | Sadashige | 144/350 |
| 3,989,078 | * 11/1976 | Hasenwinkle | 144/348 |
| 4,111,247 | * 9/1978 | Hasenwinkle | 144/350 |
| 4,122,878 | * 10/1978 | Kohn | 144/350 |
| 5,240,050 | * 8/1993 | Shing | 144/350 |
| 5,441,787 | * 8/1995 | Fujii et al. | 144/358 |
| 6,098,680 | * 8/2000 | Nien | 144/380 |

* cited by examiner

*Primary Examiner*—W. Donald Bray
(74) *Attorney, Agent, or Firm*—Browdy and Neimark

(57) ABSTRACT

A method for making a wooden blind slat includes a first step of cutting a tree trunk of a length into a plurality of rectangular slices, which are properly smoothed by a dressing tool before they are randomly joined together by an adhesive to form a rectangular board. The rectangular board is sliced in the direction perpendicular to the longitudinal surfaces of the rectangular slices into a plurality of wooden blind slats, which are smoothed again before being covered with a coat. The coated blind slats are finally dried by baking.

7 Claims, 3 Drawing Sheets

of the adjoining slices are joined together by an adhesive;

WOODEN BLIND SLATS AND METHOD FOR MAKING SAME

FIELD OF THE INVENTION

The present invention relates generally to a blind, and more particularly to wooden slats of the blind and a method for making the wooden slats of the blind.

BACKGROUND OF THE INVENTION

Slats of conventional Venetian blinds are generally made of aluminum, plastic, or wood. Wooden blind slats are attractive to consumers even if they are relatively more expensive. Wooden blind slats are generally made of basswood and Ramin wood in view of the fibers of these woods being straight and resistant to deformation. Ramin wood is a product of the tropical rain forest in South East Asia. In light of the adverse impact on the environment of excessive cutting of the forest, products made or Ramin wood are banned in Europe and in the United States. Basswood is grown in a relatively small area and is therefore hard to obtain. Needless to say, blind slats made of basswood are very expensive.

The conventional method for making the wooden blind slats comprises a first step in which a tree trunk is cut into slices, with each having a width of 2 inches, one inch, or 0.5 inch. In other words, there are three specifications as far as the width of the slices is concerned. In addition to the width specifications, the thickness of the slices must be taken into consideration. For example, the thickness of the slices having the width of 2 inches must be no less than 3 mm, whereas the thickness of the slices having the width of 1 inch or 0.5 inch must be no less than 2.5 mm. In light of the thickness requirements, the material cost can not be effectively reduced.

SUMMARY OF THE INVENTION

The primary objective of the present invention is to provide a cost-effective method for making the blind slats which are small in dimension and resistant to deformation.

The method of the present invention comprises a first step in which a tree trunk is cut into slices of a rectangular shape. Each slice has smooth longitudinal surfaces and sides. Both longitudinal ends of the slices show annual rings of the tree trunk. A plurality of the slices are joined together by an adhesive under high pressure to form a rectangular board, which is then cut from one longitudinal end thereof in the direction perpendicular to the joining surface thereof into a plurality of blind slats of a predetermined thickness. The blind slats are covered with a coat and then dried by baking. Each blind slat has two grained longitudinal surfaces. The blind slats are smoothed prior to being covered with the coat.

DETAILED DESCRIPTION OF THE INVENTION

Figure 1:
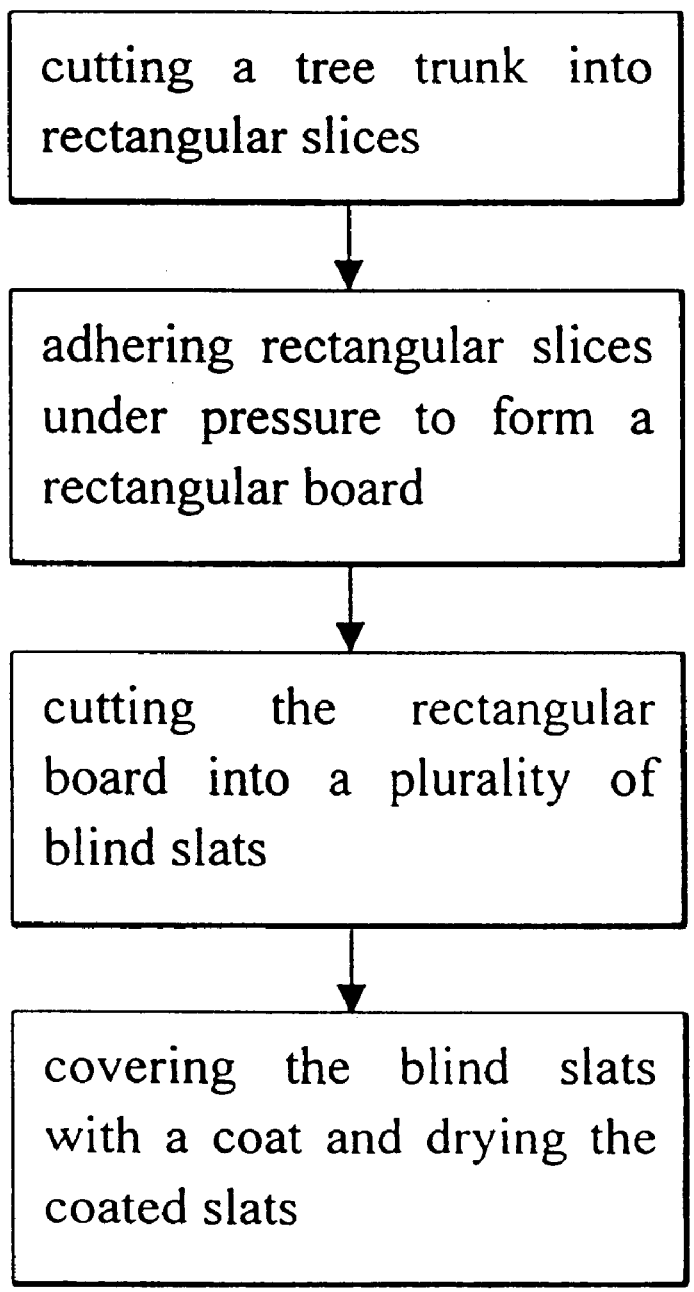
FIG. 1 shows a flow chart of the method of the present invention.
Figure 2:
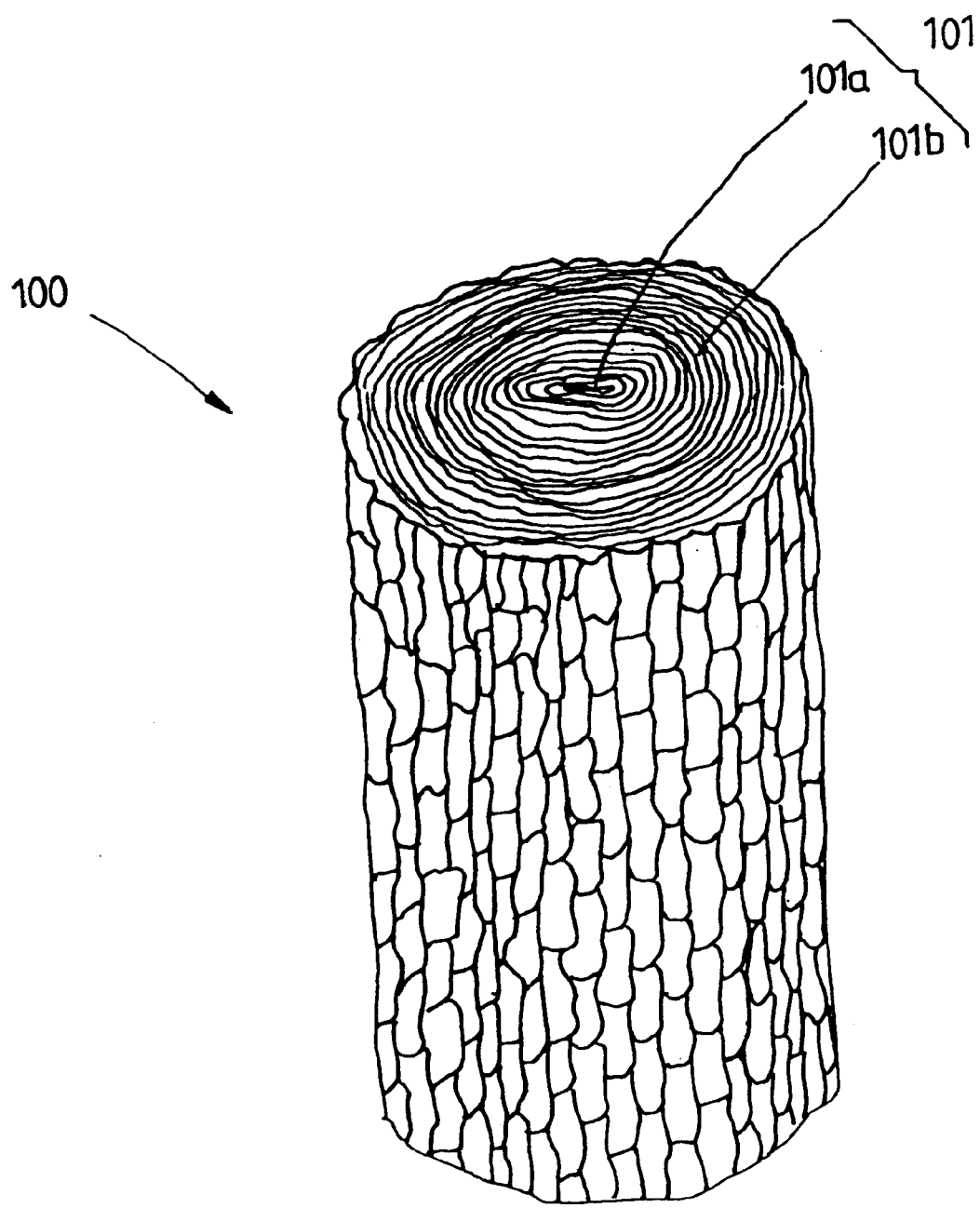
FIG. 2 shows a perspective view of a tree trunk chosen for use in the present invention.
Figure 3:
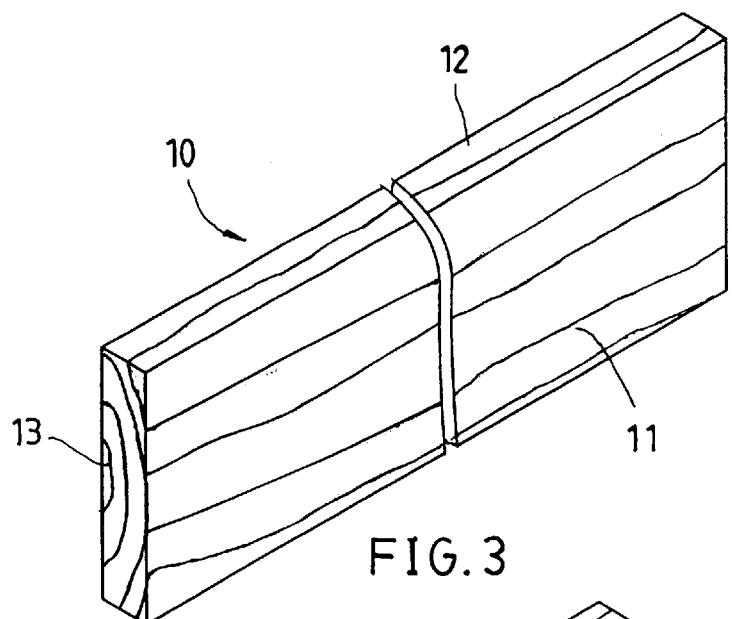
FIG. 3 shows a perspective view of a rectangular slice of the method of the present invention.

As shown in all drawings provided herewith, a method embodied in the present invention comprises a first step in which a tree trunk 100 is selected for use as a raw material in the method of the present invention. Only a xylem portion 101 of the tree trunk 100 is actually used in the present invention. The xylem portion 101 is formed of a heartwood 101a and a sapwood 101b. Both longitudinal ends of the tree trunk 100 show annual rings of the tree. The tree trunk 100 is cut along the longitudinal direction thereof into a plurality of rectangular slices 10, which are so dressed as to have two smooth longitudinal surfaces 11, two smooth longitudinal sides 12, and two smooth longitudinal ends 13 which show a profile of annual rings.

Figure 4:
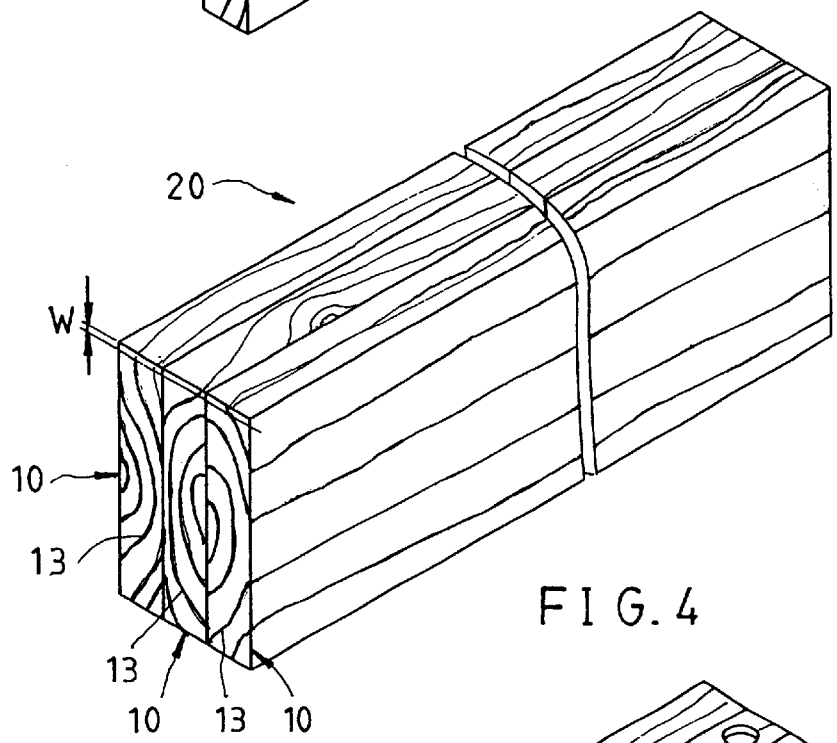
FIG. 4 shows a perspective view of a rectangular board of the method of the present invention.

The longitudinal surfaces 11 of a plurality of the rectangular slices are coated with an adhesive before the rectangular slices 10 are randomly joined together under pressure to form a rectangular board 20, as shown in FIG. 4. In view of the rectangular board 20 being formed of a plurality of the rectangular slices 10 which are joined together at random, both longitudinal ends of the rectangular board are formed of a plurality of the longitudinal ends 13 whose fiber grains are arranged in the opposite direction to provide an optimum resistance to deformation.

Figure 5:
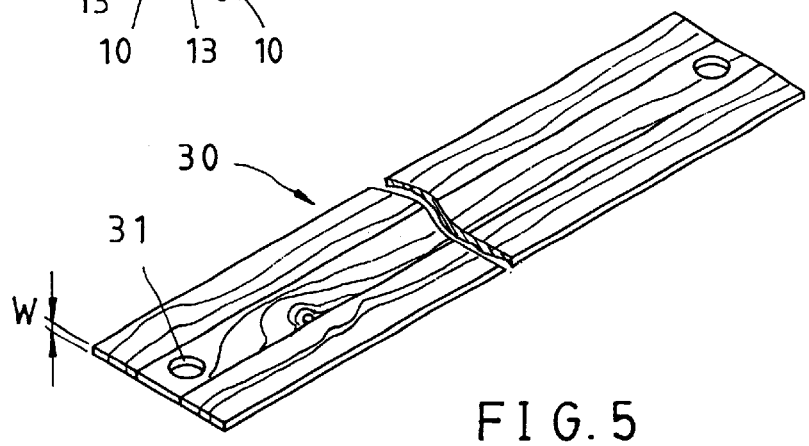
FIG. 5 shows a perspective view of an end product of the method of the present invention.

The rectangular board 20 is sliced from the longitudinal end 13 in the direction perpendicular to the joining surface of each slice 10 such that the rectangular board 20 is sliced into a plurality of blind slats 30, with each having a thickness W, as shown in FIG. 5. The blind slats 30 are properly dressed and provided with two through holes 31 which are located in proximity of both longitudinal ends of the blind slats 30 for receiving the cords of the blind. The blind slats 30 are finally covered with a coat and then dried by baking. The blind slats 30 are smoothed prior to being covered with the coat.

The method of the present invention has advantages over the conventional methods. In the process of forming the rectangular board 20 of the present invention, a plurality of the rectangular slices 10 are adhered together at random such that the wood fibers are not arranged in a linear manner, and that the fiber grains of he longitudinal ends 13 of the slices 10 are arranged in the opposite direction so as to result in the stress cancellation effect. As a result, the blind slats made by the method of the present invention are relatively more resistant to deformation. In addition, the blind slats of the present invention are provided with a decorative effect of natural wood grains. Moreover, the thickness requirement of the blind slats 30 is relatively flexible such that the thickness of the blind slats is less than 2.1 mm in relation to the width of the blind slats, which is about 2 inches, and that the thickness of the blind slats of the width of about 0.5 inch is less than 1.6 mm. As a result, the material cost of the method of the present invention is relatively lower as compared with the conventional methods.

It must be noted here that the tree trunk 100 of the method of the present invention is obtained from fir, pine, or other trees having a netlike grain or a wavy grain.

What is claimed is:

1. A method for making a wooden blind slat, said method comprising the steps of:

(a) cutting a tree trunk along the longitudinal direction of the tree trunk into a plurality of rectangular slices, with each slice having two smooth longitudinal surfaces, two smooth longitudinal sides, and two smooth longitudinal ends;

(b) joining together a plurality of the rectangular slices to form a rectangular board such that the smooth longitudinal surfaces of the adjoining slices are joined together by an adhesive;

(c) cutting the rectangular board along a direction perpendicular to the longitudinal surfaces of the rectangular slices into a plurality of blind slats, with each having a thickness;

(d) covering the blind slats with a coating; and (e) drying the coated blind slats.

2. The method as defined in claim 1, wherein the two longitudinal surfaces, the two longitudinal sides, and the two longitudinal ends of the rectangular slices of the step (a) are smoothed by a dressing tool.

3. The method as defined in claim 1, wherein the rectangular board is formed under pressure in the step (b).

4. The method as defined in claim 1, wherein the rectangular slices are joined together at random whose fiber grains are arranged in the opposite direction to form the rectangular board in the step (b).

5. The method as defined in claim 1, wherein the coated blind slats are dried by baking in the step (e).

6. The method as defined in claim 1, wherein the blind slats of the step (c) are provided with two through holes which are located in the proximity of two longitudinal ends of the blind slats.

7. The method as defined in claim 1, wherein the blind slats are smoothed before they are covered with the coat in the step (d).

* * * * *